United States Patent
Nadkarni

(10) Patent No.: US 8,558,666 B2
(45) Date of Patent: Oct. 15, 2013

(54) LOCATION DETECTION

(75) Inventor: Vijay Nadkarni, San Jose, CA (US)

(73) Assignee: Imetrikus, Inc., Seattle, WA (US)

( * ) Notice: Subject to any disclaimer, the term of this patent is extended or adjusted under 35 U.S.C. 154(b) by 948 days.

(21) Appl. No.: 12/650,627

(22) Filed: Dec. 31, 2009

(65) Prior Publication Data

US 2010/0214068 A1   Aug. 26, 2010

Related U.S. Application Data

(60) Provisional application No. 61/208,345, filed on Feb. 23, 2009.

(51) Int. Cl.
*H04Q 5/22* (2006.01)

(52) U.S. Cl.
USPC ........ 340/8.1; 340/10.1; 340/10.4; 340/10.41

(58) Field of Classification Search
USPC ............... 340/10.1–10.5, 8.1, 572.1–572.7, 340/539.1–539.19, 539.23
See application file for complete search history.

(56) References Cited

U.S. PATENT DOCUMENTS

| | | | |
|---|---|---|---|
| 5,719,564 A * | 2/1998 | Sears | 340/870.02 |
| 8,139,945 B1 * | 3/2012 | Amir et al. | 398/126 |
| 2002/0180618 A1 * | 12/2002 | Beri et al. | 340/988 |
| 2004/0078151 A1 * | 4/2004 | Aljadeff et al. | 702/40 |
| 2006/0012476 A1 * | 1/2006 | Markhovsky et al. | 340/539.32 |
| 2007/0061041 A1 | 3/2007 | Zweig | |
| 2007/0247316 A1 * | 10/2007 | Wildman et al. | 340/572.4 |
| 2008/0157970 A1 | 7/2008 | Single et al. | |
| 2009/0102606 A1 * | 4/2009 | Kim et al. | 340/10.1 |
| 2009/0201169 A1 * | 8/2009 | d'Hont et al. | 340/825.49 |
| 2009/0273473 A1 * | 11/2009 | Tuttle | 340/572.1 |
| 2009/0322548 A1 | 12/2009 | Gottlieb | |
| 2010/0141425 A1 * | 6/2010 | Tracey et al. | 340/539.1 |

* cited by examiner

Primary Examiner — Nabil Syed
(74) Attorney, Agent, or Firm — Brian R. Short

(57) ABSTRACT

Methods and systems for location detection are disclosed. One method includes a plurality of base stations of a location system obtaining information about at least one tag associated with the location system. One of the plurality of base stations is designated as a master base station for each tag. Each master base station electro-magnetically transmits beacons to each tag that the master base station has been designated as the master of. Each tag responds to the electro-magnetically transmitted beacons with an acoustic signal that identifies the tag. Multiple of the plurality of base stations, receive the acoustic signal of each tag. A location of each tag is estimated based on times of arrival of each acoustic signal of each tag at each of the multiple base stations, and based on location information of each of the multiple base stations.

13 Claims, 4 Drawing Sheets

LOCATION DETECTION

RELATED APPLICATIONS

This patent application claims priority to U.S. provisional patent application Ser. No. 61/208,345 filed on Feb. 23, 2009 which is incorporated by reference.

FIELD OF THE DESCRIBED EMBODIMENTS

The described embodiments relate generally to wireless networks. More particularly, the described embodiments relate to a method and apparatus for using wireless networks for location detection.

BACKGROUND

Location detection and determination can be useful for tracking both people and objects. Location detection within the confines of a building can be difficult to achieve with accuracy. That is, for example, some of the more common methods of location determination are not available or accurate within buildings.

GPS signals typically attenuate when passing through the walls of a building, and typically, do not provide accurate location estimations. Location detection methods that involve triangulation of electromagnetic signals from multiple sources can be expensive, and difficult to implement.

Location detection can be used for aiding in the monitoring of aging, sick or handicapped persons. For example, based on the estimated location of a person within a room of a home, a determination can be made whether the person slipped on fallen. That is, for example, a different determination can be made if a person has slipped and fallen in a bedroom versus a shower.

It is desirable to have a location detection system and method that in operable indoors, is accurate, simple and inexpensive. Additionally, it is desirable that the system and method be scalable for estimating the locations of multiple people and/or objects. Lastly, in the pursuit of simplicity, it is desirable that the system and method impose a zero or negligible computational burden on the unit in which the location is being determined.

SUMMARY

An embodiment includes a method of location detection. The method includes a tag emitting an acoustic signal, wherein the acoustic signal includes coded information that identifies the tag. A plurality of base stations receives the acoustic signal, wherein clocks of the plurality of base stations are synchronized through electromagnetic transmission between each of the plurality of base stations. Each base station time stamps an arrival time of the acoustic signal. A one of the plurality of base stations is designated as a master base station for the tag. The master base station manages estimating a location of the tag based on the times of arrival of the acoustic signal at each of the multiple base stations, and based on location information of each of the multiple base stations.

Another embodiment includes a method of location detection. The method includes a plurality of base stations of a location system obtaining information about at least one tag associated with the location system. At least one of the plurality of base stations is designated as a master base station for each tag. Each master base station electro-magnetically transmits beacons to each tag that the master base station has been designated as the master of. Each tag responds to the electro-magnetically transmitted beacons with an acoustic signal that identifies the tag. Multiple of the plurality of base stations receives the acoustic signal of each tag. A location of each tag is estimated based on times of arrival of each acoustic signal of each tag at each of the multiple base stations, and based on location information of each of the multiple base stations.

Another embodiment includes controlling the timing of the electro-magnetically transmitted beacons based on the relative motion of the tags to the base station. Another embodiment includes additionally or alternatively controlling the timing of the electro-magnetically transmitted beacons based on the number of tags associated with the location estimation system.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide location detection systems and methods of estimating the location of tags. The tags can be associated with humans and/or objects. The systems and methods provide accurate location estimations. Additionally, the systems and methods are scalable. That is, the systems and methods can provide location estimations for small or large numbers of tags.

Figure 1:
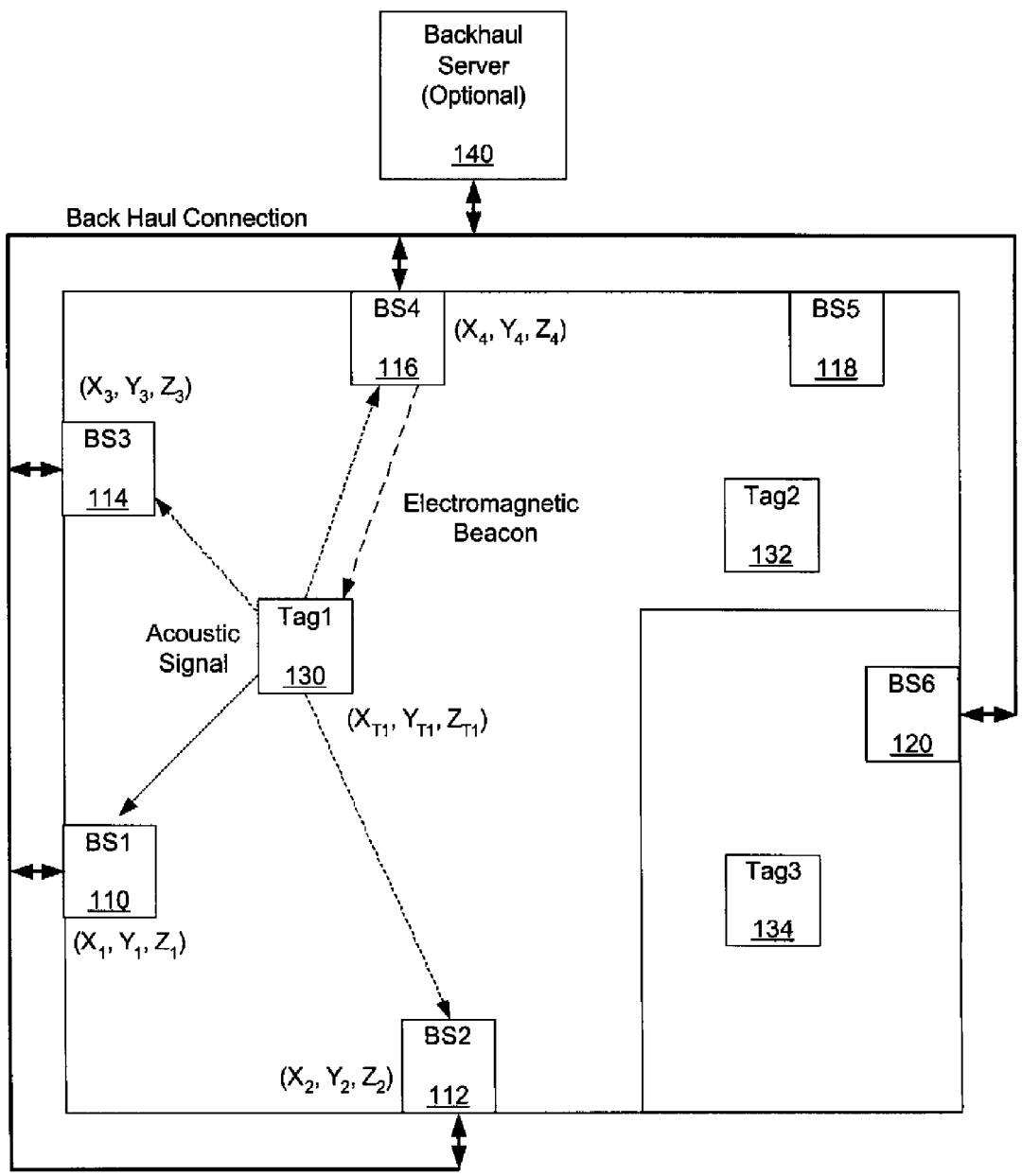
FIG. 1 shows an example of a wireless system that can utilize methods of location detection.

FIG. 1 shows an example of a wireless system that can utilize methods of location detection. The wireless system includes base stations 110, 112, 114, 116, 118, 120. The base stations 110, 112, 114, 116, 118, 120 can be located, for example, at various locations within a building. Although there are six base stations denoted in this example, the minimal number of base stations required to obtain precise three-dimensional x, y and z coordinates of location of the tag is four (4). In certain cases, where it suffices to have two-dimensional coordinates of location, typically x and y, the minimal number of base stations required to obtain precise two-dimension coordinates of location is three (3). Having a larger number of base stations than the minimum number only serves to increase the reliability of the location determination.

An embodiment includes a plurality of tags 130, 132, 134 in which each tag emits an acoustic signal. One or more of the base stations detect the location of each of the tags based on reception of the acoustic signal. The acoustic signal can be audible or ultra-sonic. The acoustic signal is transmitted having an amplitude that is large enough that the acoustic signal is received by several (at least three or four) of the base stations 110, 112, 114, 116, 118, 120. For an embodiment, the acoustic signal includes coded information that identifies the tag. The coding allows acoustic signals received from multiple tags within, for example, a common area to be identified with particular tags. Clocks of the plurality of base stations can be synchronized through electromagnetic transmission (through, for example, a back haul connection) between the plurality of base stations. Upon reception of the acoustic signal, each base station time stamps an arrival time of the acoustic signal. Due to the fact that the base stations are synchronized, the time stamps provide accurate relative times between the different base stations.

A one of the base stations that is designated as a master base station manages estimating a location of the tag based on the times of arrival of the acoustic signal at each of the multiple base stations, and based on location information of each of the multiple base stations. For an embodiment, the location information includes each of the plurality of base stations having a priori knowledge of its location relative to other of the plurality of base stations, and relative to confines (for example, a room or building) in which the plurality of base stations are mounted. It is to be understood that the actual calculations performed to determine the locations can occur anywhere. More specifically, the calculations can be performed by the master base station, or anywhere else.

Another embodiment includes the base stations 110, 112, 114, 116, 118, 120 being adapted for receiving registration beacons (as will be described, the registration beacons can be electromagnetic signals or acoustic signals) from one or more of a plurality of tags 130, 132, 134. Upon receiving the registration beacons, one of the base stations 110, 112, 114, 116, 118, 120 or a backhaul connected server 140, qualifies the tag that transmitted the registration beacon. For example, if the tag 130 transmits a registration beacon, the base stations 110, 112, 114, 116, 118, 120 can qualify the tag 130 as being a part of the system through information within the registration beacon. The registration information is coded to provide identification of the tag, and/or to provide privacy of information that is included within the registration beacon. The information of the registration beacon can be encrypted.

Once the tag (such as tag 130) has been qualified, the base stations 110, 112, 114, 116, 118, 120 and/or the backhaul connected server 140 identify one of the base stations 110, 112, 114, 116, 118, 120 that is to be the master base station of the tag 130. For this embodiment, the master, as will be described, initiates a process for determining the location of the tag 130. The master base station can be identified in a number of different ways. For example, the master base station may be identified as the base station that has the closest proximity to the tag. The proximity can be determined, for example, by comparing a signal strength of the registration beacons as received at each of the base stations 110, 112, 114, 116, 118, 120. The base station that is designated as the master base station can change over time as the tag 130 physically moves in relation to the base stations 110, 112, 114, 116, 118, 120. That is, the master base station can change from the initial designation if/when the tag physically move in relation to the physical location of the base stations 110, 112, 114, 116, 118, 120.

Once having been designated, the master base station electromagnetically transmits a beacon to the tag. The beacon is coded so that the tag knows the beacon is intended for the tag. The coding becomes particularly important when many different tags are associated with the location determination system.

Once the tag receives the beacon from the master base station, the tag transmits an acoustic signal. The acoustic signal can be audible or ultra-sonic. The acoustic signal is transmitted having an amplitude that is large enough that the acoustic signal is received by several (at least three or four) of the base stations 110, 112, 114, 116, 118, 120.

Several of the base stations (for example, base stations 110, 112, 114, 116) receive the acoustic signal. The base stations 110, 112, 114, 116, 118, 120 are all synchronized. That is, the base stations 110, 112, 114, 116, 118, 120 have a common clock or are synchronized to a common clock. Therefore, the base stations 110, 112, 114, 116 that receive the acoustic signal can determine the differences in the times of arrival of the acoustic signal at each of the base stations 110, 112, 114, 116 with fairly high precision. Through triangulation based on the differences in the times of arrival, the base stations 110, 112, 114, 116, 118, 120 and/or the backhaul server 140 can estimate the location of the tag 130.

A master base station is designated for each of multiple tags 130, 132, 134. Each of the master base stations transmits a beacon to the corresponding tag. The tags then respond with an acoustic signal, that each of the receiving base stations can use to estimate the location of each of the tags. The timing of the transmission of the beacons by each of the master base stations can be determined based upon the number of tags, and on the motion of the tags. If the tags are moving, it can be desirable to transmit the beacons more frequently to allow the locations of the tags to be determined more accurately.

Embodiments of the tags can be small (for example, the size of a match box), light and consume low amounts of power. The tags can in some situations be attached to a person, allowing the location and movements of the person to be closely monitored. As an attachable mobile device, it is important that the tags be as simple as possible. That is, for example, it is desirable to have most of the location processing be performed somewhere other than within the tag. Minimizing the processing within the tag allows the tag to be smaller and consume less power. It is to be understood that the tags can be individual devices, or the tags can be included within any other type of mobile device (such as, a mobile phone or smart device) that is associated with, for example, a human being. Alternatively, the tag can be implanted in, for example, a human being.

Acoustic signals (such as sound or ultra-sonic signals) can desirably be used for the location determination because these types of signals can be detected with simpler, less complex devices than, for example, electromagnetic signals. Furthermore, with acoustic signals travel at a far lower speed than electromagnetic signals, leading to well-conditioned equations for triangulation of location. Electromagnetic signals travel at the speed of light and typically require pico-second resolution detectors. Pico-second level resolutions can be difficult to achieve in low-cost devices, leading to ill-conditioned equations for triangulation, which in turn lead to inaccurate and/or unreliable determinations of location. Moreover, pica-second detectors are typically very expensive.

An embodiment includes the acoustic signals having a frequency range of approximately 40 KHz. This can be a desirable operating frequency because it is above the frequency range of the human ear, and therefore, less disconcerting to human beings. An embodiment includes the acoustic signals being coded ultrasonic pulses.

The base stations can be wall-mounted within the location/building of interest. For an embodiment, the base stations each are mounted at a slightly different elevation that the other base stations, providing each base station with a unique x, y and z location relative to each of the other base stations. As previously described, the base stations each are able to receive the acoustic signals transmitted by the tags. The base stations are synchronized (preferably to less than a microsecond), allowing time of arrival differences of the acoustic signals at each base station to be precisely determined. Based on the times of arrival of the acoustic signals at the base stations, and based on the fix (and known) location of the base stations, the location of the tags can be estimated.

Figure 2:
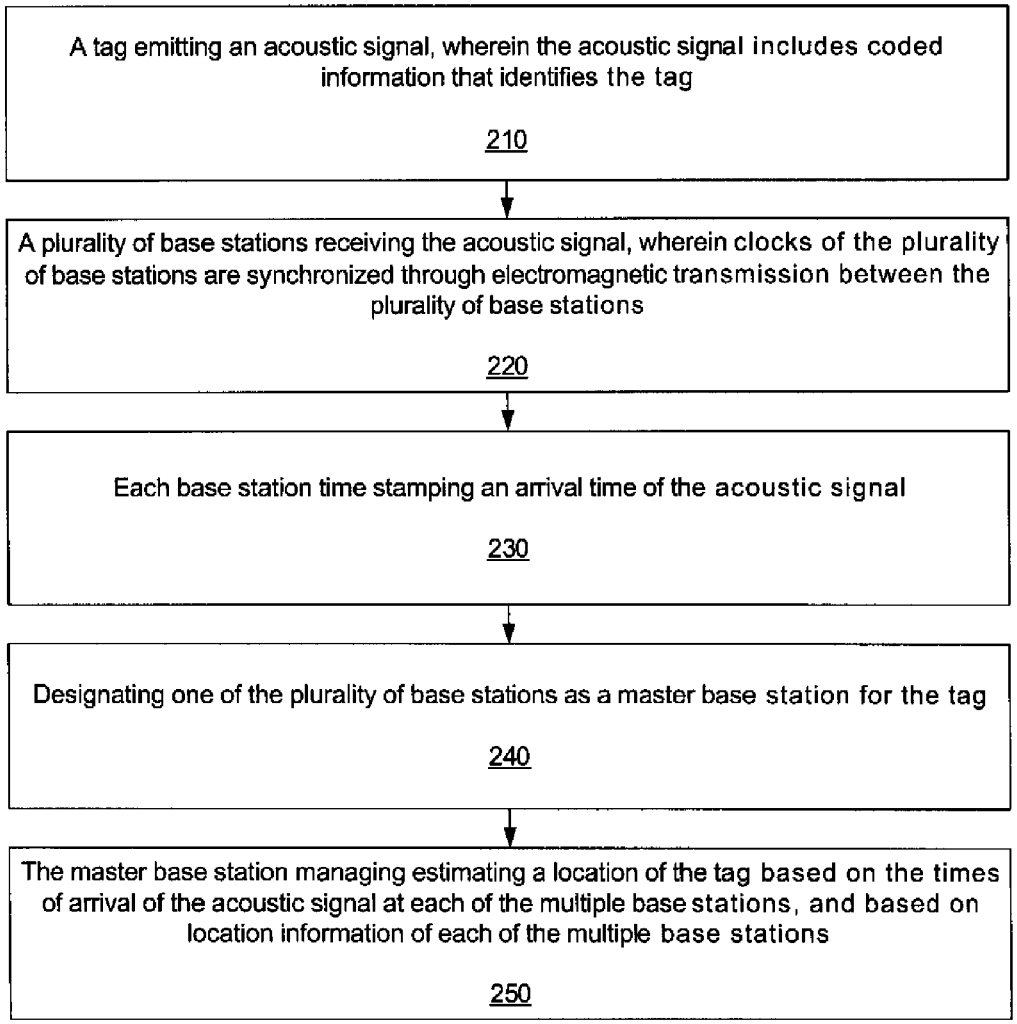
FIG. 2 is a flow chart that shows one example of steps of a method of location detection.

FIG. 2 is a flow chart that shows one example of steps of a method of location detection. A first step 210 includes a tag emitting an acoustic signal, wherein the acoustic signal includes coded information that identifies the tag. A second step 220 includes a plurality of base stations receiving the acoustic signal, wherein clocks of the plurality of base stations are synchronized through electromagnetic transmission between the plurality of base stations. A third step 230 includes each base station time stamping an arrival time of the acoustic signal. A fourth step 240 includes designating one of the plurality of base stations as a master base station for the tag. A fifth step 250 includes the master base station managing estimating a location of the tag based on the times of arrival of the acoustic signal at each of the multiple base stations, and based on location information of each of the multiple base stations.

For an embodiment, the location information includes each of the plurality of base stations having a priori knowledge of its location relative to other of the plurality of base stations, and relative to confines in which the plurality of base stations are mounted.

As will be described, embodiments include each tag periodically transmitting the acoustic signals. The period of the periodically transmitted acoustics signals for each tag can be varied, for example, based on a detected power level of a battery of the tag. More specifically, the lower the power of the battery of the tag (or a device associated with the tag) the greater the period (less frequent) of the transmitted acoustic signals.

Additionally, or alternatively, the period of the periodically transmitted acoustics signals for each tag can be varied, for example, based on a detected level of motion of the tag. More specifically, the greater the motion of the tag (or a device associated with the tag) the smaller the period (more frequent) of the transmitted acoustic signals. More rapidly moving devices typically require more location data points in order to accurately track motion of the device (tag). The motion of the tag can be sensed, for example, through the use of an accelerometer or equivalent motion detection device.

Figure 3:
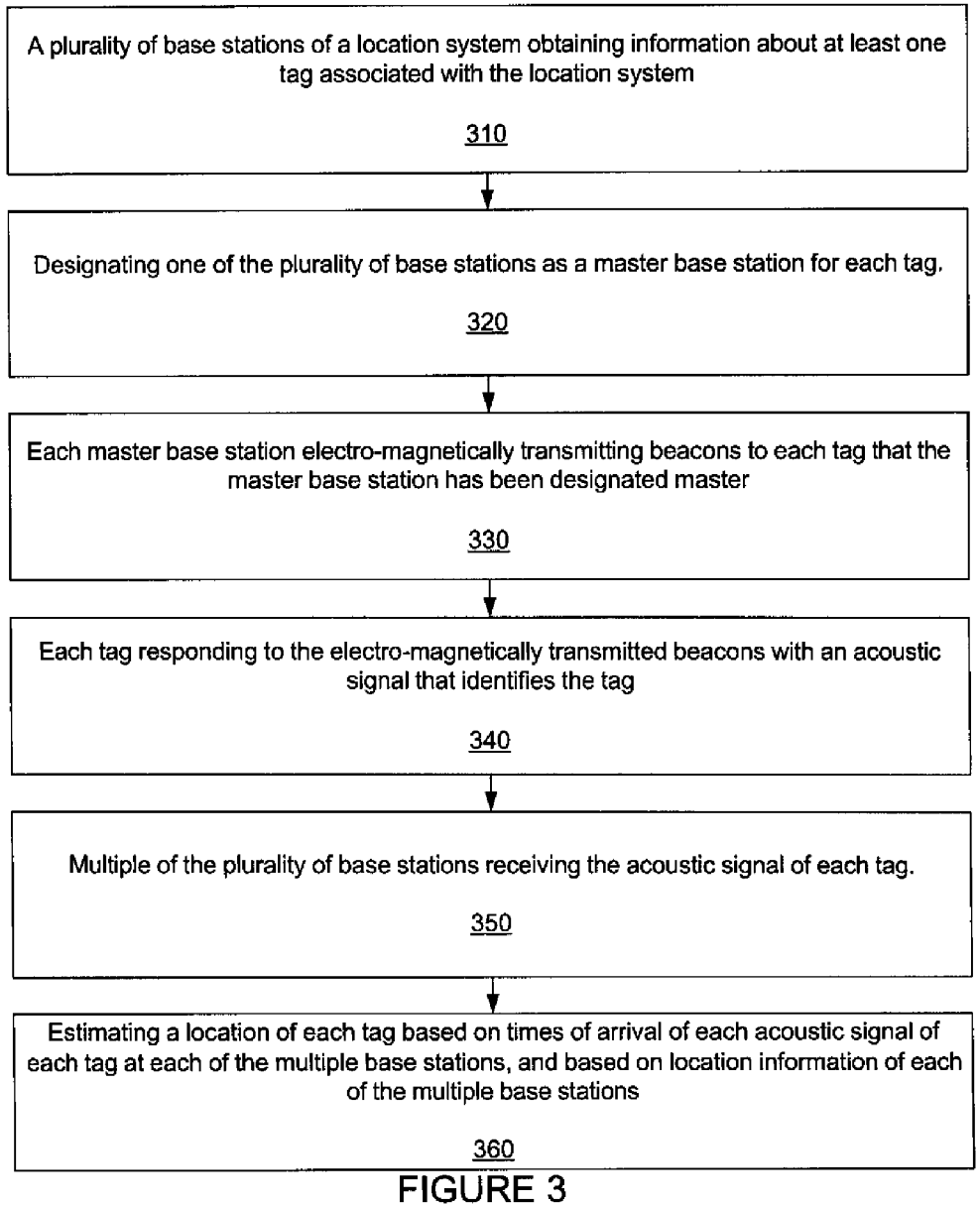
FIG. 3 is a flow chart that shows another example of steps of a method of location detection.

FIG. 3 is a flow chart that shows another example of steps of a method of location detection. A first step 310 includes a plurality of base stations of a location system obtaining information about at least one tag associated with the location system. A second step 320 includes designating one of the plurality of base stations as a master base station for each tag. A third step 330 includes each master base station electro-magnetically transmitting beacons to each tag that the master base station has been designated master. A fourth step 340 includes each tag responding to the electro-magnetically transmitted beacons with an acoustic signal that identifies the tag. A fifth step 350 includes multiple of the plurality of base stations receiving the acoustic signal of each tag. A sixth step 360 includes estimating a location of each tag based on times of arrival of each acoustic signal of each tag at each of the multiple base stations, and based on location information of each of the multiple base stations.

The master base station designation can be made by determining which of the plurality of base stations has a closest proximity to each tag. The master base station designation can be periodically updated. The updates can be driven by changing locations of one or more of the tags, or by a periodic update. The master base stations can alternatively be designated in a rotating, or even a random manner.

The master base station can deterministically set the times transmissions of the beacons. For one embodiment, each master base station periodically transmits the beacons. There can be one or more tags. Therefore, each master base station can periodically transmit beacons to a plurality of tags. For one embodiment, the master base station separates in time transmission of beacons to each of different tags.

The frequency (or alternatively, the period) of the transmission of beacons to each tag can be controlled. For one embodiment, the period of the periodically transmitted beacons is controlled based on a desired resolution of motion of the tags. That is, a tag that is in motion needs a tag location determination rate (resolution of motion) that is high enough to enable the tag to be properly tracked. The faster the tag is moving, the greater the rate at which the location detection should occur. A high rate of determination of location detection can provide an accurate assessment of the temporal and spatial trajectory of the tag. In other words, the precise motion of the tag within the region of observation can be tracked.

Additionally, the motion of the tags can be monitored and logged for future reference. Knowledge of past estimated locations can, in some situation, help to diagnose a present condition.

As described, the embodiments of location estimation can include location estimation of multiple tags. Accordingly, the master base stations typically transmit multiple different beacons to multiple different tags. An embodiment includes controlling the period of the periodically transmitted beacons based on a number of tags the master base station is transmitting the beacons to. That is, for example, the period may be smaller if the number of tags is greater. Due to the fact that multiple different beacons are being transmitted to multiple different tags, the beacons are typically coded to allow each tag to differentiate their beacon from the other beacons. Additionally, the coding can be encrypted for privacy.

The tags are stand-alone mobile units. Therefore, it is desirable to minimize power use of the tags. Accordingly, one embodiment includes detecting a power level of each tag, and controlling a period of the periodically transmitted beacons for each tag based on a detected power level of a battery of the tag. That is, if the power level of a tag is detected to be below a threshold, the beacons to those tags can be transmitted less frequently, thereby causing less energy consumption by each tag, and reducing power requirements of the tag. The beacon transmission rate (length of period) can be individually controlled for each tag, and adapted to the power available for each individual tag.

Typically, each tag goes through an initialization process when joining the location detection system. During the initialization process the plurality of base stations obtain information about each of the tags. For one embodiment, the initialization process begins with each tag transmitting a registration. The registration can be transmitted electromagnetically or acoustically. Acoustic transmission can be desirable because the tags are not required to support electromagnetic transmission, and therefore, not required to support the associated electronic circuitry and power requirements. At least one base station receives the registration, and authenticates the tag. If authenticated, a master base station is designated for each tag. The master base station then electromagnetically transmits an acknowledgement handshake to the tag. The above-described beacon transmission process begins.

Different embodiments can include different methods of determining and designating the master base stations. The master base stations can be designated, for example, by identifying which of the plurality of base stations has a best quality combination of acoustic link and electromagnetic link to the tag. The quality of each link can be determined, for example, by the received signal strength. Other embodiments include the master base stations being systematically rotated. Other embodiments include the master base station being randomly designated.

The location estimation can be aided to some extent by strategically locating the bases stations. For example, one embodiment includes each of the plurality of base stations occupy a substantially different horizontal plane than the other of the plurality of base stations. Therefore, each of the base stations occupies not only a unique x and y locations, but also unique z elevations.

The processing between the base stations can be decentralized, or centralized. Both configurations, however, include interconnections between the base stations. The interconnection can be a wired or wireless backhaul connection that interconnects all of the base stations. For centralized processing and control, a central server can be connected to the backhaul To aid in the location estimation, the base stations are synchronized. Because the base stations are synchronized, the time of arrival at each of the base stations can be compared relative to the time of arrival at the other base stations. That is, the location of each tag is estimated by comparing times of arrival of the acoustic signal with known relative locations of each of the plurality of base stations.

Figure 4:
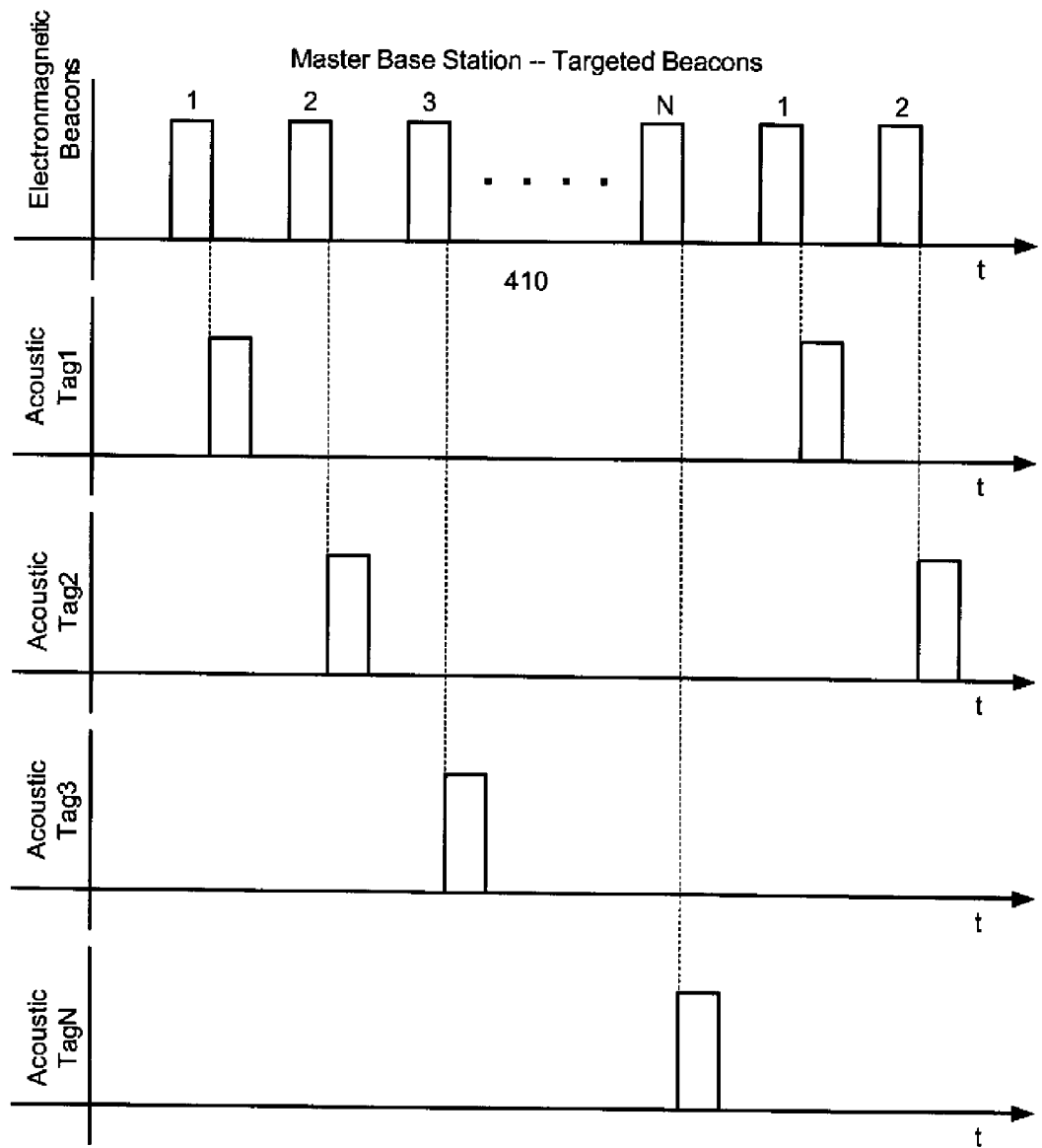
FIG. 4 is a set of time-lines showing an example of time relationships between electromagnetic beacon transmission by a master base station, and acoustic signal response by a plurality of tags.

FIG. 4 is a set of time-lines showing an example of time relationships between electromagnetic beacon transmission by a master base station, and acoustic signal response by a plurality of tags. As shown by a first time-lime 410, the master base station transmits a series of beacons, in which each beacon is coded for reception by one of several different tags. For the time-line shown, each of the beacons is evenly spaced in time, and each successive beacon is transmitted to a different one of the tags. However, there are no limitations on the timing and sequence of the transmission of the beacons. That is, beacons for one tag can be transmitted more frequently than beacons for another tag. This situation can occur, for example, if one of the tags is determined to be stationary, and the other tag is determined to be mobile. The greater the mobility (faster or more frequent motion) the more frequently the beacons can be transmitted. Also as described, the frequency of the transmission of different beacons can vary depending upon a detected level of available power at each tag. If the available power is low, the beacons can be transmitted less frequently, resulting in power savings.

As shown, the master base station transmits 1 through N beacons to N tags. The beacons are electromagnetically transmitted and coded for the corresponding tag to receive. As shown, each tag responds to its beacons with the transmission of an acoustic signal. The acoustic signal is coded as well, allowing the base stations that receive each acoustic signal to identify which tag transmitted the acoustic signal.

As previously described, the base stations estimate the locations of each of the tags base on the times of arrivals of each of the acoustic signals at each of the synchronized base stations, and the known locations of the base stations. The embodiments described allow for the majority of processing occurring at the base stations, allowing the tags to be simple. Therefore, the tags do not consume much power, and are physically small.

Although specific embodiments have been described and illustrated, the embodiments are not to be limited to the specific forms or arrangements of parts so described and illustrated.

What is claimed:

1. A method of location detection, comprising:
   a plurality of base stations of a location system obtaining information about each of a plurality of tags associated with the location system;
   designating one of the plurality of base stations as a master base station for each tag, comprising identifying which of the plurality of base stations has a best quality combination of acoustic link and electromagnetic link to the tag;
   each master base station electro-magnetically transmitting beacons to each of the plurality of tags that the master base station has been designated master, wherein the master base station transmits beacons of different tags at separate transmission times;
   each tag responding to the electro-magnetically transmitted beacons with an acoustic signal that identifies the tag, wherein the acoustic signal of each of the different tags are separated in time as determined by the separate transmission times of the beacons transmitted to each of the different tags;
   multiple of the plurality of base stations receiving the acoustic signal of each tag;
   detection motion of at least one of the tags;
   estimating a location of each tag based on times of arrival of each acoustic signal of each tag at each of the multiple base stations, and based on location information of each of the multiple base stations;
   detecting location data points for each tag at a rate that is dependent upon how fast the tag is moving.

2. The method of claim 1, wherein designating one of the plurality of base stations as a master base station for each tag comprises:
   determining which of the plurality of base stations has a closest proximity to each tag; and
   updating which one of the plurality of base stations is the master base station at a rate determined by changing locations of the tags.

3. The method of claim 1, wherein each master base station deterministically times transmissions of the beacons.

4. The method of claim 3, wherein each master base station periodically transmits the beacons.

5. The method of claim 1, further comprising generating temporal and spatial trajectories of each tag based upon the detection of location data points.

6. The method of claim 1, further comprising controlling a period of the periodically transmitted beacons based on a number of tags the master base station is transmitting the beacons to.

7. The method of claim 1, further comprising controlling a period of the periodically transmitted beacons for each tag based on a detected power level of a battery of the tag.

8. The method of claim 1, wherein each beacon is coded for a particular tag.

9. The method of claim 1, wherein the plurality of base stations obtaining information about the each of a plurality of tags comprises:
   the each of a plurality of tags transmitting a registration;
   at least one base station receiving the registration and authenticating the each of a plurality of tags;
   if authenticated, designating a master base station for the each of a plurality of tags;
   the master base station electromagnetically transmitting an acknowledgement handshake to the each of a plurality of tags.

10. The method of claim 1, wherein each of the plurality of base stations occupy a substantially different horizontal plane than the other of the plurality of base stations.

11. The method of claim 1, wherein the plurality of base stations are interconnected by a backhaul connection, and controlled by a central server.

12. The method of claim 1, wherein the plurality of base station are synchronized, and the location of each tag is estimated by comparing times of arrival of the acoustic signal with known relative locations of each of the plurality of base stations.

13. A location determination wireless system, comprising:
a plurality of base stations;
at least one tag, the at least one tag providing the plurality of base stations with information about the at least one tag;
designating one of the plurality of base stations as a master base station for each of the at least one tag, comprising identifying which of the plurality of base stations has a best quality combination of acoustic link and electro-magnetic link to the tag;
each master base station electro-magnetically transmitting beacons to each of the plurality of tags that the master base station has been designated master, wherein the master base station transmits beacons of different tags at separate transmission times;
each tag responding to the electro-magnetically transmitted beacons with an acoustic signal that identifies the tag, wherein the acoustic signal of each of the different tags are separated in time as determined by the separate transmission times of the beacons transmitted to each of the different tags;
multiple of the plurality of base stations receiving the acoustic signal of each tag;
detection motion of at least one of the tags;
estimating a location of each tag based on times of arrival of each acoustic signal of each tag at each of the multiple base stations, and based on location information of each of the multiple base stations;
detecting location data points for each tag at a rate that is dependent upon how fast the tag is moving.

* * * * *